United States Patent Office 2,953,619
Patented Sept. 20, 1960

2,953,619

BATTERY GRID ALLOY

Harold E. Zahn, Buffalo, N.Y., assignor to Gould-National Batteries, Inc., St. Paul, Minn.

No Drawing. Filed July 31, 1958, Ser. No. 752,168

3 Claims. (Cl. 136—65)

This invention relates to lead-acid storage batteries, and more particularly to an improved grid metal alloy composition which is particularly suited for use in the fabrication of the battery positive plates, but may also be beneficially employed to form the negative plates and other metal components of the battery structure.

It is a primary object of the present invention to provide an improved grid alloy as aforesaid whereby a battery having plates fabricated of said alloy will possess markedly improved self-discharge rate characteristics.

Another object of the invention is to provide an alloy as aforesaid which will enhance the battery life expectancy.

Still another object of the invention is to provide an alloy achieving the objectives set forth hereinabove without necessitating use in its formulation of substantial quantities of relatively expensive ingredients.

Still another object of the invention is to provide an improved alloy as aforesaid which is of acceptable hardness and strength and readily fabricated by conventional production methods, thereby minimizing the percentage of production rejects due to physical flaws such as cracks, blow holes, shrinkage and the like.

Still another object of the invention is to provide an improved alloy as aforesaid wherein the chemical distribution of the alloy components is of optimum uniformity and segregation thereof is minimized, and wherein the desired molecular locking precipitation takes place uniformly throughout the mass.

Still another object of the invention is to provide an improved alloy as aforesaid which minimizes structural and chemical transitions between the progressively solidifying portions thereof. Other objects and advantages of the invention will appear from the specification hereinafter.

Heretofore, relatively high antimony alloys have been used almost exclusively in the battery industry, with a view to acquiring the necessary physical strength and ease of casting into grid form by standard production techniques. However, such relatively high antimony alloys have proven to be disadvantageous for various reasons including relatively rapid rate of corrosion which not only results in premature malfunctioning of the grid per se, but also introduces antimony into the electrolyte which thereupon adversely affects the negative plates of the battery. The adverse effects referred to include migration of released antimony to the negative plate where it causes spontaneous discharge of the plate by local cell action between the antimony and the sponge lead of that plate. Thus, the available battery capacity continuously decreases during periods of battery non-use. Another adverse effect due to antimony contamination of the negative plate is that it creates a sulfated negative condition, as a result of the capacity decreasing "local action" referred to hereinabove. This condition is characterized by formation of hard granular active material in the negative plate, which is difficult to restore to a healthy condition capable of delivering its designed capacity. The term "relatively high antimony content alloys" as used hereinabove refers to that class of battery grid alloys containing from 4 to 12% antimony; the balance being substantially lead within some cases minor proportions of additives usually intended to improve castability. Such high antimony content alloys have proven to be deficient in certain respects as explained for example hereinabove.

However, it has heretofore been found to be impracticable to produce a satisfactory alloy, for the purposes herein discussed, of low antimony contents; that is, below the 4% antimony compositions. Previously suggested alloys in this lower antimony content category have proven to be defective because of their inherent brittleness and lack of sufficient ductility whereby they tend to rupture during battery assembly and use, and also because of their pronounced tendencies to show component segregation. Other previous alloys have been so soft as to be impracticable for mechanized handling.

The present invention provides a novel alloy composition based upon the discovery of the critical inter-related effects of the several metallic elements comprising components of the alloy. The composition of the invention distinguishes from previously disclosed battery alloys in which advantages are claimed for the introduction of single metallic elements to otherwise well known battery grid metal compositions, such as for example, by the simple addition of arsenic. Metallurgical studies of the complex metal relationships involved in the lead-antimony-arsenic-tin-copper alloy system, led to the discovery that within certain limits of composition, when small amounts of antimony, arsenic and tin are added to lead, previously unpredicated results may be obtained as regards the alloy physical characteristics. For example, a low antimony alloy characterized by low self-discharge characteristics which would be strong and non-brittle may be formulated.

It was further discovered that the desired effects of copper in the alloy could only be realized if the copper is used only in limited quantities. In other words, the discovered critical relationships between the lead-antimony-arsenic-tin components of the alloy which provide the desired alloy characteristics can be readily upset if the copper content is not controlled. In this study it was discovered that undesirable effects of excess copper in the alloy result from formation of complex copper intermetallic phases which upset the metallurgical balance and cause formation of complexes having differential solidification temperatures and localized precipitation effects. The useful effects of copper in the composition in accord with the present invention can only be obtained when the copper is strictly limited in relationship to the other elements of the alloy. Thus, it was discovered that the valuable individual effects of the various elements of the alloy could be obtained beyond the results of simple additive effects such as the obviously expectable improvements in physical characteristics, only when the alloy components are employed in the critical proportions set forth hereinbelow.

More specifically, the present invention contemplates broadly provision of a new and improved alloy which is characterized by an antimony content of between 1½% to about 4½%, while being of practicable ductility characteristics for the purposes referred to. A relatively small amount of arsenic, tin and copper are included to provide the alloy with the desired strength, fluidity, hardness, and corrosion resistance characteristics. For example, in alloys containing from 1½% to 4½% antimony, arsenic will preferably be present from .10% up to .50%; tin will be present from .10% up to .50%; and copper will be present from .005% up to .05%.

Extensive research in the subject has revealed that an alloy comprising specifically the components referred to hereinabove and in the critical content percentages given, will perform in an acid battery assembly to provide a substantially reduced self-discharge rate and a substantially longer life battery, compared to alloys herein referred to as of the "high antimony" type and any previously devised alloys of low antimony content. It appears that one outstanding advantage of this alloy of the present invention is that the relatively low antimony content minimizes the corrosion resistance problem and permits usage of a correspondingly lower arsenic content.

Use of copper in the specified amounts in the alloy of the present invention operates to give the alloy the required ductility, strength and hardness characteristics; while the tin additive operates to give the alloy desirable fluidity characteristics. Also, the presence of copper in the specified amounts with or without silver as explained hereinafter, reduces the tendency toward brittleness inherent in low antimony alloys with or without arsenic. It is a particular feature of the invention that the components of the alloy in the critical content percentages ranges specified, provide an alloy having every desirable fluidity, strength and hardness, and corrosion resistance characteristic; in combination with improved electrochemical performance characteristics whereby the battery employing the grid alloy of the present invention possesses substantially lower self-discharge rate characteristics and longer life. Furthermore, it is a particular feature of the alloy of the invention that the features and advantages attained as hereinabove set forth are obtainable in the case of the present invention by means of a specific formulation which is relatively economical to produce from the standpoint of the cost of materials and of the alloy formulation and grid fabrication techniques involved.

For example, an alloy of the present invention consisting of 2.8% antimony; .44% arsenic; .014% copper; .46% tin; and the balance lead, was used to construct a series of battery grids of commonly used style and dimensions; and these grids were then assembled in standard battery cells and comparatively bench-tested against "control" grids identically similar except that the "control" grids were formed of a currently common alloy consisting of 7% antimony; .05% arsenic; .02% copper; .5% tin; and the balance lead. The test and control grids were fabricated under identical commercial battery production conditions, and the test batteries were assembled in accord with standard production line techniques; and all processing and assembling and testing of the batteries was in accord with established production procedures. The batteries were then subjected to self-discharge tests, wherein the batteries were discharged at the 300 ampere rate after completion of building, to establish their initial capacity. Duplicate batteries were allowed to stand for about 24 weeks without any attention, and were then discharged at the 300 ampere rate to measure the capacity loss resulting from the stand. The capacity retained relative to the capacity of the fresh batteries is reflected by the graphs of Figs. 1 and 2 herewith, and it will be noted that the alloy of the present invention provided a marked improvement over the commonly used "7% antimony alloy" in this respect. With reference to Fig. 1, note that during inactive standing the 7% antimony batteries show a faster rate of specific gravity loss, which is an index to capacity remaining. Fig. 2 depicts the relative capacity losses quantitatively.

The batteries were also subjected to overcharge tests, to obtain a measure of grid corrosion resistance. For this purpose the batteries were subjected to a weekly cycle consisting of 999 ampere hours' overcharge, followed by 48 hour open circuit stand. The batteries were then discharged at the rate of 13 amperes for three and one-half hours or until a 5.1 volt cutoff occurred, whichever happened first. Failures were considered to have taken place on that weekly cycle in which the battery voltage fell below 5.1 volts before three and one-half hours discharge at 13 amperes was completed. Reference to Fig. 3 of the drawing herewith shows that the alloy of the present invention performs in this respect to much greater advantage than the common "7% antimony" type alloy.

As a possible modification of the basic alloy of the present invention, small amounts of silver may be added to the basic ternary allow of lead-antimony-arsenic to further improve the corrosion resistance. For this purpose silver may be added to the alloy formulations described hereinabove in amounts between .05% and .10%; the copper component referred to hereinabove being correspondingly reduced, if preferred, from the formulation when silver is thus added. By this means, suitable ductility characteristics may be maintained.

This application is a continuation-in-part of application Serial No. 582,735, filed May 4, 1956, now abandoned.

I claim:

1. In a storage battery of the lead-acid type, a plate structure comprising a pasted grid, said grid being formed of a lead-antimony-arsenic-tin-copper alloy, said alloy including antimony from not less than 1½% to not more than 4½% by weight; arsenic from about .10% to about .50% by weight; tin from about .10% to about .50% by weight; copper from .005% to .05% by weight; the remainder being lead; the presence of arsenic in the alloy providing a corrosion-inhibiting effect, the presence of tin in the alloy providing a fluidity improving effect, and the presence of copper in the alloy providing a ductility, strength, and hardness improving effect.

2. A storage battery plate grid of cast metal alloy comprising a lead base alloy comprising an antimony content of not less than 1½% and not more than 4½% by weight; an arsenic content of not less than .10% and not more than .50% by weight; a tin content of not less than .10% and not more than .50% by weight; and a copper content of not less than .005% and not more than .05% by weight; characterized by being resistant to electrochemical corrosion and disintegration under alternately charging and discharging battery operating conditions.

3. A storage battery plate grid of cast metal alloy including an antimony content of about 2.80% by weight; an arsenic content of about .44% by weight; a copper content of about .014% by weight; a tin content of about .46% by weight; and the remainder being lead.

References Cited in the file of this patent

UNITED STATES PATENTS

| | | |
|---|---|---|
| 2,252,104 | Walde | Aug. 12, 1941 |
| 2,678,340 | Stoertz | May 11, 1954 |
| 2,678,341 | Stoertz | May 11, 1954 |
| 2,694,628 | Carroll | Nov. 16, 1954 |